United States Patent [19]

Vaughn

[11] 4,308,363

[45] Dec. 29, 1981

[54] HALOGENATION OF ORGANIC POLYMERS HAVING ANHYDRIDE GROUPS

[75] Inventor: Walter L. Vaughn, Lake Jackson, Tex.

[73] Assignee: The Dow Chemical Company, Midland, Mich.

[21] Appl. No.: 137,062

[22] Filed: Apr. 3, 1980

[51] Int. Cl.³ .............................. C08F 8/20; C08F 8/22
[52] U.S. Cl. .................................. 525/329; 427/385.5; 525/327; 525/356
[58] Field of Search ...................... 525/356, 327, 329; 427/385.5

[56] References Cited

U.S. PATENT DOCUMENTS

| | | | |
|---|---|---|---|
| 3,226,884 | 6/1967 | King | 525/356 |
| 3,374,174 | 3/1968 | Le Suer et al. | 525/356 |
| 3,523,930 | 8/1970 | Maloney | 260/80.8 |
| 3,536,685 | 10/1970 | Landauer et al. | 525/356 |
| 3,579,485 | 3/1971 | Folzenlogen et al. | 525/356 |
| 3,631,156 | 12/1971 | Vaughn | 260/78.4 D |
| 3,631,157 | 12/1971 | Vaughn | 260/78.5 T |
| 3,803,087 | 4/1974 | Vaughn | 260/470 P |

*Primary Examiner*—William F. Hamrock
*Attorney, Agent, or Firm*—W. J. Lee

[57] ABSTRACT

Halogenation of organic polymers having pendant anhydride groups as such, or when said halogenation is followed by reaction of the pendant anhydride groups with nucleophiles, yields novel halogenated derivatives of said polymers.

8 Claims, No Drawings

HALOGENATION OF ORGANIC POLYMERS HAVING ANHYDRIDE GROUPS

BACKGROUND OF THE INVENTION

Organic polymers containing pendant —COOH groups are well known and may be prepared by various processes, e.g., as shown in U.S. Pat. Nos. 3,441,545; 3,264,269; 3,310,518; 3,361,842; 3,413,272; and 3,520,861. Typically, such polymers are prepared by polymerizing a monomer mixture comprising at least one monomer having carbon-to-carbon alpha-beta ethylenic unsaturation (e.g., olefins, vinyls, acrylates, methacrylates, and the like) with at least one monomer having not only carbon-to-carbon unsaturation but also containing at least one carboxylic acid (—COOH) group (e.g., acrylic acid, methacrylic acid, maleic acid, fumaric acid, itaconic acid, crotonic acid, cinnamic acid, citraconic acid, succinic acid, and the like). Various copolymers terpolymers, interpolymers, oligomers, and polymer blends are known which contain pendant —COOH groups, including those which are formed by grafting the —COOH groups onto an existing organic polymer chain. It is also known to produce —COOH groups on organic polymer chains by hydrolysis of pendant ester groups on the chain, e.g., a polymer which contains ethyl acrylate as one of the monomers may be hydrolyzed, splitting off ethanol and leaving pendant —COOH groups on the polymer chain.

It is also known to convert such pendant —COOH groups to anhydride groups, (—CO—O—CO—R), where R is organic, by reaction with, e.g., an acyl halide (U.S. Pat. No. 3,523,930) or a ketene (U.S. Pat. No. 3,631,157); also as shown in U.S. Pat. No. 3,803,087 and U.S. Pat. No. 3,631,156. Furthermore, it is known (e.g. U.S. Pat. No. 3,803,087) to react nucleophiles (denoted here as NuH) having active hydrogens (or alkali metal derivatives) with said pendant anhydrides to form derivatives, denoted here as (—CO—Nu), of the anhydride groups.

The polymers having pendant anhydride groups may be reacted or crosslinked with compounds or polymers having two or more nucleophilic groups, thus forming polymers wherein two or more anhydride groups on a polymer molecule are reacted with two or more groups on a polyfunctional compound or wherein anhydride groups on different polymer molecules are reacted with nucleophilic groups on a single polyfunctional compound. Steric factors and molecular mobility will generally govern or affect which anhydride group reacts with a given nucleophilic group, it being realized by artisans that low molecular weight, low viscosity polymers (e.g., dimers, trimers, oligomers) are more mobile than higher molecular weight, more viscous polymers.

SUMMARY OF THE INVENTION

It has now been found that novel halogenated derivatives of organic polymers having pendant anhydride groups (or derivatives of said anhydride groups) are prepared by halogenating the organic polymers having said pendant anhydride groups prior to any reaction of said anhydride groups with nucleophiles, NuH or NuY, containing active hydrogen groups, H, (or alkali metal, Y, derivatives thereof) to form derivatives of said anhydride groups.

DETAILED DESCRIPTION

In accordance with the present invention, polymers containing pendant anhydride groups are halogenated prior to reacting the anhydride groups with nucleophiles to form anhydride derivatives. In this manner, it is possible to form novel halogenated compounds which are not obtainable by halogenation of the beginning polymer containing —COOH groups or by halogenation of the polymer after formation of the anhydride derivatives. This is because halogenation of the —COOH containing polymer will cause halogenation of the —COOH group itself and interfere with subsequent formation of anhydride groups; also halogenation of polymers having derivatives of the anhydride groups will cause halogenation of the anhydride derivative itself. It has been found, unexpectedly, that halogenation of the polymer *after* anhydride formation, but *before* any anhydride derivative formation will create novel halogenated polymers.

The novel halogenated polymers prepared in accordance with the present invention are useful as coating resins, as modifiers of resin alloys and formulations, and in some cases as molding resins or casting resins. The halogen groups contribute to combustion-resistance of the polymers and generally improve the toughness, adhesion, and tenacity of the polymers. The halogenated anhydride-containing polymers may be reacted with nucleophiles to form derivatives of the anhydride groups or may be crosslinked or cured (thermally or chemically) to form solvent-resistant tough coatings, films, elastomers, or other products. The anhydrides are compatible with pendant —COOH groups so that interpolymers or polymer blends may be prepared which contain free —COOH groups; in such case it is possible to create novel polymers by reacting the anhydride groups with one chemical agent and the —COOH groups with another agent (if desired) or to crosslink either type of pendant group while leaving the other type of group for other purposes. Anhydride groups can be crosslinked with reactive polyfunctional compounds, such as polyethylenimines, polyglycols, etc. to form new compositions of matter.

Anhydride groups may be reacted with ammonia or amines to form amides which are very sensitive (reactive) to contact with molecular halogens and/or free halogen radicals; however, if it is desired to have such amide groups on the polymer and also desired to have halogen groups on the polymer, then it is necessary to halogenate the anhydride-containing polymer *prior* to forming an amide group from the anhydride group.

The generalized reactions involved here, if beginning with the pendant —COOH groups on a polymer, may be exemplified as follows:

1. MM—COOH $\xrightarrow{prior\ art}$ MM—CO—O—CO—R

2. MM—CO—O—CO—R $\xrightarrow[inert\ solvent]{halogenation}$ MM(X)—CO—O—CO—R

3. MM(X)—CO—O—CO—R $\xrightarrow{NuH}$ MM(X)—CO—Nu where MM represents a polymer chain segment to which the subject group is pendant, R is a substituted or unsubstituted organic group, e.g., an alkyl, aryl, alkaryl, aralkyl, or polymer group, or a hydrogen group, X is one or more halogen groups attached to one or more carbons in the polymer chain segment, and Nu is a nucleophile of a compound with an active hydrogen, H, (or alkali metal, Y) attached thereto. A polymer chain will, of course, contain a plurality of said MM segments and a plurality of said functional groups.

It will be readily understood that if one already has the anhydride product with which to perform the above No. 2 reaction, then the No. 1 reaction is not needed. If one is starting from the MM—COOH polymer, attempts to halogenate such polymer generally gives a reaction of halogen with the —COOH group, giving rise to —COOX groups. If one reacts MM—CO—O—CO—R with a nucleophile to form MM—CO—Nu and then attempts to halogenate the product, the halogen is more likely to attack the pendant group than to attack the polymer backbone.

THE PROCESS IN GENERAL

It is best to perform the process steps in an inert solvent, e.g., benzene or halogenated solvents, taking care to control or substantially exclude moisture and oxygen from the reaction since they tend to affect the results by reaction with free radicals. The amount of polymer which can be easily handled in solution is dependent on its solubility which, in a given solvent, is generally inversely related to its molecular weight. Polymers of low molecular weight can be prepared as easily handled solutions of, say, 20–30% by weight polymer concentration; polymers of high molecular weight, in order to be easily handled in solution, are usually held at low concentrations of, say, about 3–5% by weight.

For instance, a halogenated anhydride product is obtained in solution at about 15% by wt. in a solvent which resists free radical halogenation; the polymer is very sensitive to moisture or other materials having labile hydrogens and is also heat-sensitive and can "gel up" if heated to a sufficient temperature or for a sufficient time, thereby causing disproportionation of the anhydride groups.

Generally, temperatures in the range of about 20° C. to about 100° C. are suitable; reactions at temperatures much below about 20° C. are generally too slow to be practical and temperatures above about 100° C. are generally so vigorous and irregular as to require extra controls and safe-guards. In order to avoid substantial disproportionation of the anhydride groups, the temperature is generally held to about 80° C. or less, preferably about 50°–70° C. It is readily apparent that the evaporation rate of the solvent should be taken into account and, when necessary, the reaction vessel sealed to avoid substantial loss of solvent. In some cases, operation at reflux of the solvent may be advisable.

Halogenation is performed using molecular halogens, i.e., $Cl_2$, $Br_2$, $I_2$, or $F_2$ or a compound which yields a halogen radical. In most cases, actinic radiation, e.g. ultraviolet light, aids the halogenation operation. In general, the halogenation time depends upon temperature, catalyst, amount of halogen present, type of halogen, and concentration effects. It is preferred to keep the halogenation time to less than about 2 hours and it is therefor recommended to operate at as high a temperature as is possible without encountering substantial side-reactions and to use a catalyst or activator such as U.V. light.

Chlorine and bromine are the halogens of greatest interest in the present invention. Chlorine is more reactive than bromine. The halogen can be added to give different levels of halogen add-on. Bromine chloride and iodine chloride are useful as halogenating agents.

Other halogenating agents which are within the purview of this invention include, e.g., sulfuryl chloride, t-butyl hypochlorite, trichloromethanesulphonyl chloride, N-chloroamides, phosphorous pentachloride, iodobenzene dichloride, N-chloroamines, N-bromosuccinimide, bromotrichloromethane, t-butyl hypobromite, trichloromethane sulphonyl bromide, and the like. The principal criteria is that the halocompound be one which will yield a free halogen radical under the conditions involved.

Among the nucleophiles which are within the purview of this invention are, e.g., alcohols, amines, thioalcohols, amides, ureas, aminoalcohols, ammonia, and the like. Polyfunctional nucleophiles, such as compounds, dimers, oligomers, or polymers containing more than one nucleophilic group may be employed, such as polyvinyl alcohol, polyethylenimine, polyamides, polyglycols, ethylenediamine, cyanuric acid, and the like.

A general procedure which may be followed is outlined below:

1. A polymer base resin containing —COOH groups is dissolved in an inert anhydrous organic solvent which can resist halogens and/or halogen free radicals.
2. The solution is treated with an acrylation agent such as organic acid halide, a ketene, or an anhydride, preferably at elevated temperature.
3. The mixture is stirred and heated until the anhydride adduct is formed.
4. Any excess acrylation agent is preferably removed.
5. The reaction product is treated, still in hot solution, with a halogenation agent to halogenate the polymer backbone.
6. Halogen halide and excess halogenation agent are preferably stripped out.
7. A nucleophile is added and reacted with the polymer, still in hot solution, to form derivatives of the anhydride groups.
8. The product may be kept in solution or may be precipitated or stripped of solvent for further use or handling.

If one already has the anhydride form of the functional groups on a polymer, then steps 1–4 above are not needed.

EXAMPLE 1

An ethylene/acrylic acid copolymer (denoted here as MM—COOH) is dissolved in an inert anhydrous solvent (benzene) at about 70° C. to obtain a polymer solution of about 5% concentration by weight. A substantial number of the —COOH groups are converted by reacting the hot polymer in solution with acetyl chloride, taking care to substantially exclude air and moisture, thereby converting the —COOH groups to anhydride (—CO—O—CO—$CH_3$) groups, the reaction giving off HCl. The HCl and XS acetyl chloride are stripped out.

The hot polymer is then chlorinated using $Cl_2$, giving a novel product which is denoted here as MM(Cl)—CO—O—CO—$CH_3$ which indicates that chloride groups are attached to the polymer backbone segments. The excess $Cl_2$ is stripped out along with the HCl formed. Infrared analysis confirms the presence of chlorine on the polymer backbone and also the presence of the anhydride groups.

The so-formed solution of MM(Cl)—CO—O—CO—$CH_3$ is reacted at about 70° C. with ethylamine ($CH_3$—$CH_2$—$NH_2$) to convert the anhydride groups to —CO—NH—$CH_2$—$CH_3$, liberating $CH_3$—CO—OH which is stripped from the reaction mixture. The solution is useful as a coating solution, giving a strong adherent coating on a substrate when the solvent is evaporated.

EXAMPLE 2

In similar manner of Example 1 other nucleophiles are reacted with chlorinated ethylene/acrylic acetic anhydride copolymer, MM(Cl)—CO—O—CO—R, the nucleophiles being morpholine, piperidine, 3-chloropropanol, diethylamine, fatty amine (containing 18-22 carbon atoms per molecule), ammonia, various di-substituted amines, various mono-substituted amines, primary alcohols, secondary alcohols, thiols, and alkanolamines, all of which create derivatives of the anhydride groups, denoted here as —CO—Nu.

EXAMPLE 3

Terpolymers of ethylene/isobutyl acrylate/acrylic acid are converted to anhydrides (ethylene/isobutylacrylate/acrylic acetic anhydride terpolymer) which are brominated in solution in perchloroethylene to form novel polymers. These novel polymers are reacted with the same nucleophiles as in Examples 1 and 2 above to create novel polymers wherein the anhydride groups have been converted to derivatives by the action of the nucleophiles.

I claim:

1. Halogenated organic polymers, having pendant anhydride groups, of the formula MM(X)—CO—O—CO—R, where MM is a repeating chain segment of an organic polymer, X is one or more halogen groups attached to one or more carbons of said segment, and R is at least one moiety selected from the group consisting of hydrogen, substituted or unsubstituted organic groups and polymer groups, said halogenated organic polymers being prepared by halogenating a precursor organic polymer of the formula MM—CO—O—CO—R, where the MM segment comprises recurring copolymer groups of at least one non-halogen-containing olefin, vinyl, acrylate, or methacrylate monomer copolymerized with at least one non-halogen-containing alpha, beta-ethylenically unsaturated carboxylic acid monomer in which the resulting pendant —COOH groups on said copolymer have subsequently been converted to said anhydride groups.

2. The polymer of claim 1 wherein X is at least one of chloride, bromide, or iodide groups.

3. The product-by-process of claim 1 wherein the segment MM comprises a copolymer of at least one olefin selected from the group consisting of ethylene, propylene, and butylene and at least one carboxylic acid selected from the group consisting of acrylic acid and methacrylic acid, said carboxylic acid having been converted to said anhydride.

4. The product-by-process of claim 1 wherein the segment MM comprises a copolymer of at least one acrylate and at least one carboxylic acid selected from the group consisting of acrylic acid and methacrylic acid, said carboxylic acid having been converted to said anhydride.

5. The product-by-process of claim 1 wherein the segment MM comprises a copolymer of at least one acrylate, at least one olefin selected from the group consisting of ethylene, propylene, and butylene, and at least one carboxylic acid selected from the group consisting of acrylic acid and methacrylic acid, said carboxylic acid having been converted to said anhydride.

6. An article comprising the polymer of claim 1 on a substrate.

7. An article comprising the polymer of claim 1 in molded form.

8. An article comprising the polymer of claim 1 in the form of a film or thin sheet.

* * * * *